No. 709,461. Patented Sept. 23, 1902.
M. D. BEACH.
ACID MIXER FOR FACILITATING THE TESTING OF MILK AND CREAM.
(Application filed Feb. 16, 1901.)
(No Model.) 2 Sheets—Sheet 1.
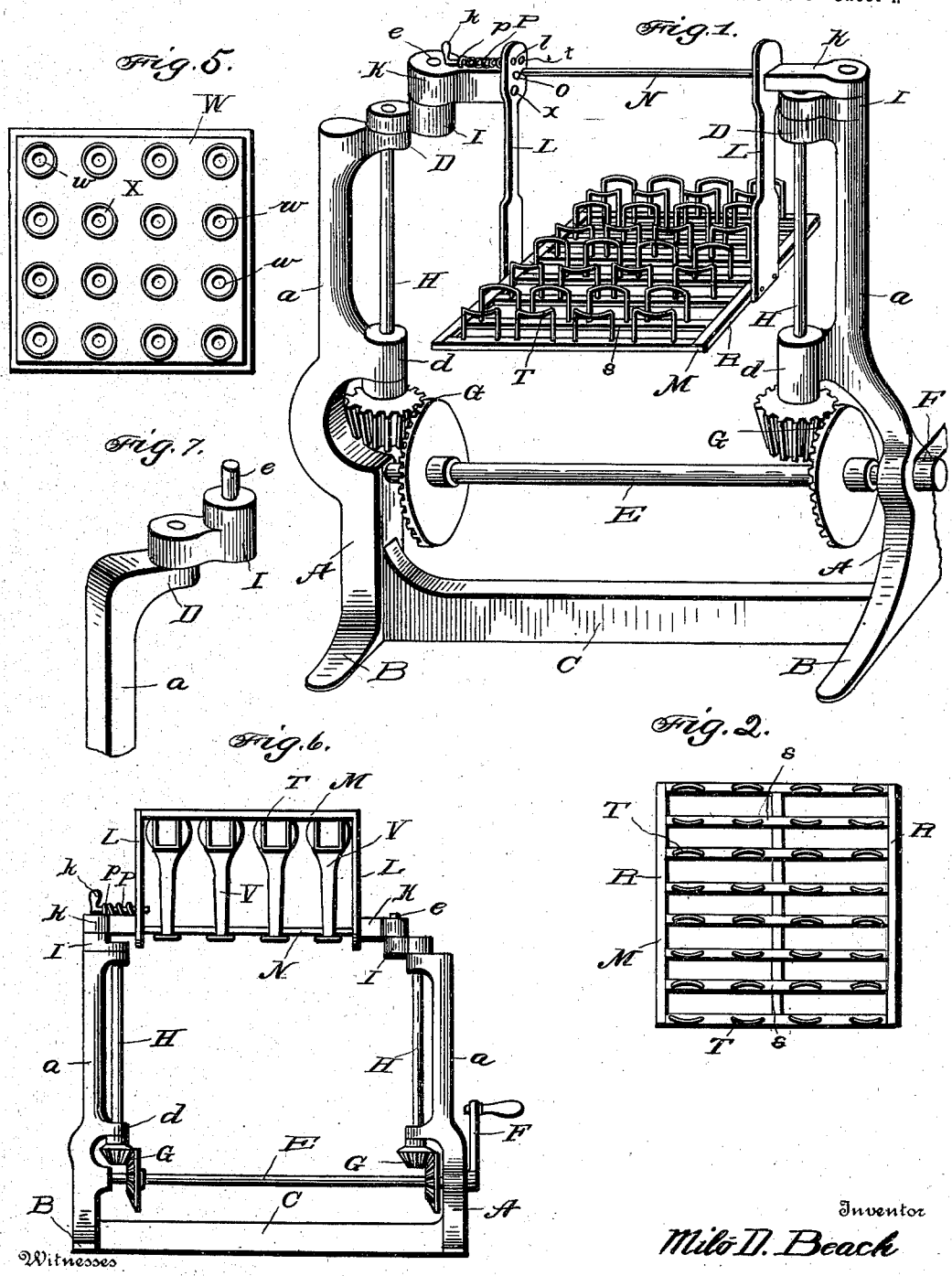
Inventor
Milo D. Beach
By M. M. Cady
Attorney
Witnesses
R. A. Boswell
Theodore Dalton No. 709,461. Patented Sept. 23, 1902.
M. D. BEACH.
ACID MIXER FOR FACILITATING THE TESTING OF MILK AND CREAM.
(Application filed Feb. 16, 1901.)
(No Model.) 2 Sheets—Sheet 2.
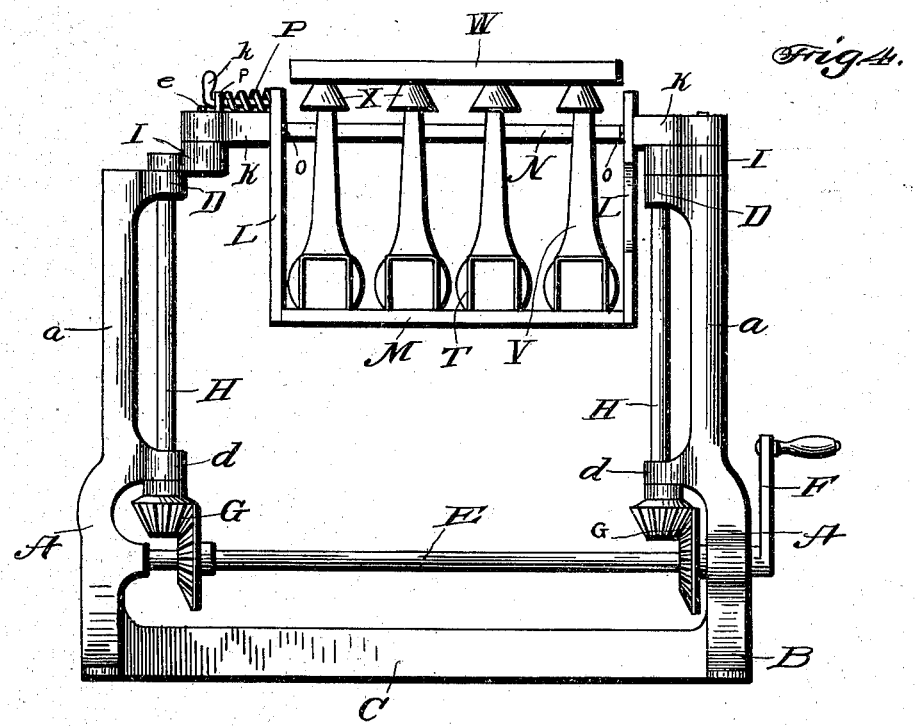
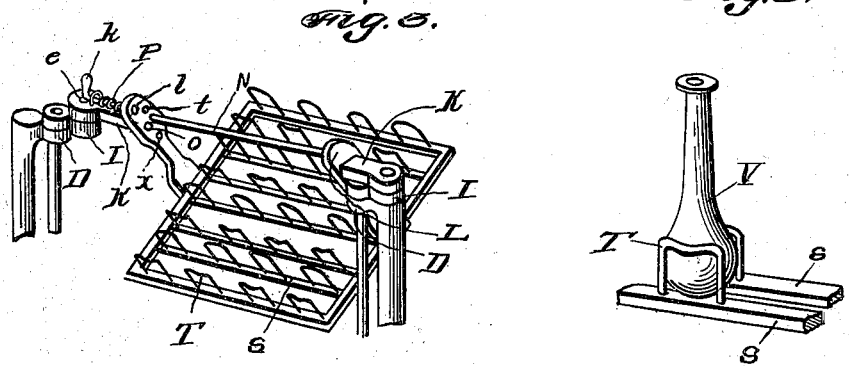
Witnesses
R. A. Boswell.
Theodore Dalton
Inventor
Milo D. Beach.
By M. M. Cady
Attorney

UNITED STATES PATENT OFFICE.

MILO D. BEACH, OF LITCHFIELD, CONNECTICUT, ASSIGNOR TO THE SHARPLES COMPANY, OF CHICAGO, ILLINOIS, A CORPORATION OF NEBRASKA.

ACID-MIXER FOR FACILITATING THE TESTING OF MILK AND CREAM.

SPECIFICATION forming part of Letters Patent No. 709,461, dated September 23, 1902.

Application filed February 16, 1901. Serial No. 47,568. (No model.)

*To all whom it may concern:*

Be it known that I, MILO D. BEACH, a citizen of the United States, residing at the town of Litchfield, county of Litchfield, and State of Connecticut, have invented certain new and useful Improvements in Acid-Mixers for Facilitating the Testing of Milk and Cream; and I do hereby declare the following to be a full, clear, and exact description of the invention, such as will enable others skilled in the art to which it appertains to make and use the same.

The object of my invention is to provide convenient means for readily and rapidly mixing acid with milk or cream for the purpose of making tests of the value of the butter-producing qualities of those commodities; also, to expedite the work of milk-testing by facilitating the means of rapidly emptying the bottles, refilling with hot water, and thoroughly rinsing and cleaning after each set of tests.

It consists chiefly in an upright frame within which is suspended a tray supplied with means for removably holding the bottles within the tray and in one or more gears attached to the frame and tray for horizontally revolving without rotating the tray.

It further consists in providing means for holding the tray with the bottles therein in a rigid manner and also in permitting the bottles and the tray to be tilted at various angles or inverted and then holding them in such tilted and inverted positions. Heretofore in machines of this character the bottles have been either reciprocated or rotated, which prevented a thorough mixing of the cream and acid, for in the rotation of the bottles the cream by centrifugal force would hug the inner periphery and hinder a thorough commingling of the acid and in a reciprocation of the bottles the motion is too violent, there being danger of spurting the contents from the bottle-mouths, and, besides, the mixing is not as quickly and smoothly accomplished; but the present invention comprises a mechanism which will impart revolutions without rotation to the bottles, the latter being held in a stationary and upright position in the tray, so that the cream and acid are gradually and thoroughly mixed by a few turns, thus rapidly and accurately accomplishing its purpose and at the same time preventing burning of the cream by the acid.

With these objects and others of minor importance and with this general mode of construction in view the following specification will develop in detail the manner of construction and will point out how the objects are fully accomplished when taken in connection with the drawings accompanying the same and forming a part hereof.

Figure 1 shows a perspective of the machine complete. Fig. 2 is a plan view of the upper side of the tray. Fig. 3 is a perspective showing a portion of the machine with the tray tilted at an angle for introducing the acid to the bottles beneath the cream. Fig. 4 is a front elevation showing the machine with a filling-tray upon the top of the bottles for filling the same with water in cleaning. Fig. 5 is a plan view of the under side of the filling-tray shown in Fig. 4. Fig. 6 shows a front elevation of the machine with the bottles in the inverted position for emptying and cleaning. Fig. 7 is a detailed view of one of the parts of the bearings. Fig. 8 shows a perspective of one of the bottles in its clasp or clamp.

Like letters of reference denote corresponding parts in all of the drawings.

Referring to the drawings, A designates the frame of the machine, which is composed of two uprights *a*, feet B, and the cross-stay C. The uprights *a* are provided with projections D and *d*, all of which serve as bearings for the gear presently to be described.

Through the uprights *a*, near their lower ends, is inserted a shaft E, which finds its bearings in the frame. The shaft is provided with a handle F on one end on the outer side of the upright. On the same shaft, between the two uprights, are set near each end one wheel of a beveled gear G. Through the projections D and *d* passes a shaft H, to the lower end of which is rigidly attached the other wheel, comprising the beveled gear G. To the top of each shaft is rigidly affixed an arm I. (Shown in Figs. 1, 4, and 6.) The arm I extends out beyond the projections D and is provided with a pin $e$. Upon this pin is pivoted another arm K. To the outer end of the arm K is pivoted the hangers L by the pivot-pin $o$, and to the bottom of the hangers is rigidly attached the tray M, which tray is stayed by the cross-rod N.

Upon the top of the left-hand arm K is secured a pin $k$, which pin engages with a hole $l$ in the left-hand hanger L. Attached to and coiled around the pin $k$, between a staple $p$, set in the arm K, and the side of the hanger L, is a spring P, which holds the pin $k$ in engagement with the hole $l$ for the purpose of locking and maintaining the tray at the position shown in Figs. 1 and 4. Another hole $t$ is formed in the left-hand hanger-arm L, with which the pin $k$ engages when the tray is tipped to other angles, such as shown in Fig. 3, and a hole $x$, with which said pin engages when the tray and bottles are inverted, as shown in Figs. 6. The pin $h$ holds the tray with the bottles rigid in whatever position they are tilted.

The tray M is composed of strips of iron R, through which strips $s$ are inserted. Upon these strips $s$ are secured spring-clamps T, between which the bottles V are inserted. The clamps T are fixed in the base of the tray and extend up on both sides of the bottle and hold the bottles firmly, but permit them to be readily removed.

For the purpose of introducing the water to clean the bottles V there is set upon the top of the bottles the pan W, which is provided with inverted guiding-funnels X, attached by their smaller ends to the under side of the pan. These funnels correspond in number and position to the pairs of bottle-clamps on the tray M, so that when properly placed over it there shall be a funnel over the center of each pair of clamps. Over the center of each funnel is a hole $w$ in the bottom of the pan W. These holes are to permit the water to run from the pan into the bottles. As the bottles stand in the clamps, part of the bottle-mouths might not come directly under the holes $w$, and such bottles would not be filled; but as the flaring ends of the funnels are larger than the bottle-tops the latter readily enter the funnels, and when the pan W is forced down the inclosed sides of the funnels guide the tops of the bottles to their correct position under and in alinement with the holes $w$, and all the bottles are filled by pouring water into the pan.

The mode of operating my device will be readily understood. The bottles V are placed in the clamps T within the tray M and partly filled with milk or cream, and then the pin $k$ is withdrawn from the hole $l$ and the tray is tilted, preferably to an angle of about forty-five degrees, as shown in Fig. 3, the pin now engaging the hole $t$. The acid is then introduced into the top of the bottle and will run down the inner surface of the bottle and underneath the milk or cream. The object of this is to prevent the acid from burning the milk, which prevents a clear and accurate test. This cannot be accomplished where the acid is poured directly upon the top of the milk with the bottle standing perpendicularly. The operator then returns the tray to the position shown in Fig. 1 and grasps the handle F and turns it, which movement revolves the beveled gear G, and that in turn revolves the arm I, since it is fixed rigidly upon the upright shaft H, and as the arm K is pivoted upon the arm I the outer end of said arm K will be turned in a circular manner upon the arm I, which will bring the tray M around toward the upright on one side, and a further movement of the crank F will bring the tray back to the opposite side. In this manner the tray, with the bottles held stationary therein, will be revolved in a horizontal plane from side to side of the frame, causing a short, circular, and jerky motion to be given to each individual bottle, whereby the acid and the milk or cream are thoroughly mixed and mixed in such a manner that there is no burning of the cream by the acid while mixing. When the milk or cream is thoroughly mixed with the acid, then the bottles may be placed in any standard tester and a test of the milk or cream determined in the usual manner. To wash the bottles, first invert the tray, as shown in Fig. 6, the pin $k$ now being in engagement with the hole $x$, allowing the mixture of milk and acid to run out. Then after dropping the tray to the position shown in Fig. 4 the pan W is placed upon the bottles in such a manner that the bottle-tops shall enter the funnels and the water poured into the pan W, which fills the bottles, after which the bottles may be revolved in the same manner as for mixing the acid with the milk. To empty the bottles, it is only necessary to withdraw the pin $k$ from the hole in the swinging arm L and turn the bottles up, as shown in Fig. 6, and then insert the pin $k$ in the hole $x$, when the water will be readily emptied therefrom.

It will be readily observed by this mode of construction and manner of operating that not only the mixing of the acid with the milk or cream is accomplished most thoroughly by the short, circular, and jerky revoluble movement imparted to the tray with the bottles therein, but great rapidity in the testing of the milk or cream is accomplished, especially where there are numerous tests to be made, since the mixing is accomplished so rapidly and the bottles are so quickly cleaned and prepared for other tests.

Having now described my invention, what I claim is—

1. In a device of the class described the combination with a frame, of a tray supported therein, means on the tray to removably hold a plurality of bottles, said means forming a constrictive engagement about each bottle independently of the others, and means for moving the tray and the bottles in a circle in a horizontal plane.

2. In a device of the class described the combination with an upright frame, of a tray supported therein and adapted to support a plurality of bottles, a series of clamps carried by the tray to form a constrictive engagement about each bottle, whereby the bottles are independently removable and securely held on the tray, means to permit the tray and bottles to be held in a tilted or inverted position, and means for moving the tray and bottles in a circle in a horizontal plane.

3. In a device of the character described, a frame, upright shafts journaled in the frame, crank-arms I secured to the shafts, links K pivoted to the arms I, a tray suspended by the links, yielding clamps secured to the tray to hold the bottles, and means for rotating the upright shafts to move the tray and bottles in a circle in a horizontal plane.

4. In a device of the character described, the combination with a frame having vertical shafts journaled therein, of a tray pivotally suspended within the frame to permit it to be swung vertically and provided with yielding clamps to hold a number of bottles, means for rotating the shafts, adjunctive mechanism between the shafts and the tray for moving the tray and bottles in a circle in a longitudinal plane.

5. In a device of the character described, a frame, a tray suspended within the frame, clasps attached to the tray for holding bottles, means for moving the tray and bottles in a circle in a horizontal plane, and means to permit the bottles to be tilted or inverted and hold them in such tilted or inverted positions, as and for the purposes shown.

6. In a device of the character described, an upright frame, a tray suspended from the frame, yielding clamps attached to the tray for holding bottles thereon, gearing for moving the tray in a circle in a horizontal plane, and means for tilting or inverting the bottles and holding them in such changed positions, as and for the purposes shown.

7. The combination of an upright frame, upright shafts H, arms I and links K, a tray pivotally suspended from the links K and provided with means to hold the bottles, means on one of the links K to hold the tray in a tilted or inverted position, and means for revolving the tray and bottles in a horizontal plane.

8. The combination of an upright frame, upright shafts H, a tray, crank-and-link connections between the tray and shaft, clamps on the tray for removably holding bottles, means for rotating the shafts to move the tray and bottles in a circle in a horizontal plane, and means for permitting the bottles to be inverted or tilted at an angle, and means for holding them in such changed positions.

9. The combination of the upright frame, shafts E and H, beveled gear G, arms I and links K, hangers suspended from the links K, one of said hangers having holes, a tray attached to the hangers, clamps attached to the tray for holding bottles, and a spring-actuated pin secured to one of the links K and adapted to engage one of the holes in a hanger, all combined as and for the purposes shown.

In testimony whereof I affix my signature in the presence of two witnesses.

MILO D. BEACH.

Witnesses:
ROBERT L. ROCHFORT,
WM. H. BRAMAN.